United States Patent
Weatherl (10) Patent No.: US 9,915,281 B2
(45) Date of Patent: Mar. 13, 2018

(54) THEFT-RESISTANT CABLE CLAMP

(71) Applicant: REINKE MANUFACTURING CO., INC., Deshler, NE (US)

(72) Inventor: Bradley George Weatherl, Fairbury, NE (US)

(73) Assignee: Reinke Manufacturing Co., Inc., Deshler, NE (US)

( * ) Notice: Subject to any disclaimer, the term of this patent is extended or adjusted under 35 U.S.C. 154(b) by 0 days.

(21) Appl. No.: 15/700,573

(22) Filed: Sep. 11, 2017

(65) Prior Publication Data
US 2017/0370398 A1 Dec. 28, 2017

Related U.S. Application Data

(62) Division of application No. 14/169,848, filed on Jan. 31, 2014, now Pat. No. 9,784,298.

(51) Int. Cl.
*F16B 39/24* (2006.01)
*H02G 3/32* (2006.01)
*A01G 25/09* (2006.01)

(52) U.S. Cl.
CPC ............ *F16B 39/24* (2013.01); *A01G 25/092* (2013.01); *H02G 3/32* (2013.01); *H02G 2200/10* (2013.01); *Y10T 29/49838* (2015.01)

(58) Field of Classification Search
CPC ......... F16B 39/24; A01G 25/092; H02G 3/32; H02G 2200/10; Y10T 29/49838
See application file for complete search history.

(56) References Cited

U.S. PATENT DOCUMENTS

| 682,847 | A | | 9/1901 | Forsythe | |
|---|---|---|---|---|---|
| 706,903 | A | | 8/1902 | Crawford | |
| 1,362,244 | A | * | 12/1920 | Farley | F16L 3/133 24/279 |
| 1,457,106 | A | | 4/1922 | Estep | |
| 1,996,447 | A | | 2/1934 | Warager | |
| 2,001,215 | A | * | 5/1935 | Ruppel | E04B 1/24 403/157 |
| 2,081,065 | A | | 6/1936 | Place | |

(Continued)

FOREIGN PATENT DOCUMENTS

BR 9103123 U2 7/2015

OTHER PUBLICATIONS

CopperCuff, Cable Theft Deterrent, flyer, dated 2008, 2 pages.
(Continued)

*Primary Examiner* — Jeanette E Chapman
(74) *Attorney, Agent, or Firm* — Shook Hardy & Bacon, LLP (57) ABSTRACT

Aspects of the present invention provide a theft-resistant cable clamp that increases the time and effort required to remove the cable from the irrigation equipment, thereby deterring thieves As the extensions that protrude from the cable-reception loop are forced together, the walls of the cable-reception loop compress against the cable. Openings in the extensions on the cable clamp allow the cable clamp to fit over a component of the irrigation equipment. A plurality of teeth can protrude from the perimeter of an opening to grip the exterior of the component. A coupler or other component may have a groove into which the teeth engage when the cable clamp is in a final location on the component.

20 Claims, 4 Drawing Sheets

(56) References Cited

U.S. PATENT DOCUMENTS

| | | | |
|---|---|---|---|
| 2,617,667 A | 6/1948 | Stout et al. | |
| 2,992,733 A | 10/1957 | Buus et al. | |
| 3,285,313 A * | 11/1966 | Blakesley | F16B 39/24 411/149 |
| 3,316,605 A | 5/1967 | Tabbert | |
| 3,340,494 A * | 9/1967 | Gutshall | H01R 4/26 411/149 |
| 3,404,858 A * | 10/1968 | Levy | F16L 3/227 248/230.9 |
| 3,558,258 A * | 1/1971 | Johnson | A01G 25/092 239/731 |
| 3,796,124 A * | 3/1974 | Crosa | E04D 3/3605 411/521 |
| 4,201,111 A * | 5/1980 | Kuttler | F16B 37/041 411/527 |
| 4,318,518 A | 3/1982 | Davis | |
| 4,479,625 A | 10/1984 | Martz | |
| 4,535,960 A | 8/1985 | Downing et al. | |
| 4,624,092 A | 11/1986 | Baginski | |
| 4,757,662 A | 7/1988 | Gasser | |
| 4,897,005 A * | 1/1990 | Peterson | F16B 37/02 411/112 |
| 5,004,194 A * | 4/1991 | Watanabe | F16L 3/123 174/163 R |
| 5,178,503 A | 1/1993 | Losada | |
| 5,220,710 A | 6/1993 | Laudan et al. | |
| 5,284,110 A * | 2/1994 | Hostetler | A01K 39/0213 119/72 |
| 5,897,281 A * | 4/1999 | Haga | F16B 37/0842 411/521 |
| 6,508,442 B1 | 1/2003 | Dolez | |
| 6,715,720 B2 | 4/2004 | Finn | |
| 6,783,104 B1 * | 8/2004 | Roth | F16B 7/0433 248/226.11 |
| 7,819,364 B2 * | 10/2010 | Duggan | F16L 3/137 248/58 |
| 9,206,807 B2 * | 12/2015 | Li | F16F 1/324 |
| 2004/0089738 A1 * | 5/2004 | Heren | A01G 25/02 239/271 |
| 2010/0258658 A1 * | 10/2010 | Christensen | A01G 25/092 239/723 |
| 2011/0248104 A1 * | 10/2011 | Malsam | A01G 25/092 239/723 |
| 2012/0286076 A1 * | 11/2012 | Korus | A01G 25/09 239/743 |

OTHER PUBLICATIONS

Valley Irrigation, CableGuard Products, flyer, dated 2012, 4 pages.
Pivot Protection, Irrigation Protection from Copper Thieves, flyer, undated, 3 pages.

* cited by examiner

THEFT-RESISTANT CABLE CLAMP

CROSS-REFERENCE TO RELATED APPLICATIONS

This application is a divisional of U.S. patent application Ser. No. 14/169,848, filed Jan. 31, 2014, and titled "THEFT-RESISTANT CABLE CLAMP," the entirety of which is hereby incorporated by reference.

BACKGROUND

Copper is becoming an increasingly popular target for thieves. In particular, the theft of copper cables attached to mechanized irrigation equipment ("MIE") is a frequent occurrence. Existing theft deterrent systems on irrigation equipment can trigger an alarm when a cable is severed. However, the relative isolation of MIE leads to relatively long response times, if any response occurs at all. By the time police respond to the alarm, the thieves have absconded with the cabling. Therefore, a need exists to increase the deterrent for thieves to remove cabling from irrigation equipment by making the cable more difficult to remove.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Aspects of the present invention provide a theft-resistant cable clamp that increases the time and effort required to remove the cable from the irrigation equipment, thereby deterring thieves. The cable clamp includes a cable-reception loop that secures the cable within the clamp and extensions that attach the cable clamp to irrigation equipment. As the extensions that protrude from the cable-reception loop are forced together, the walls of the cable-reception loop compress against the cable, thereby securing the cable within the cable-reception loop.

Openings in the extensions on the cable clamp allow the cable clamp to fit over a component (e.g. coupler) of the irrigation equipment. A plurality of teeth can protrude from the perimeter of an opening to grip the exterior of the coupler. A coupler or other component may have a groove into which the teeth engage when the cable clamp is in a final location on the component.

BRIEF DESCRIPTION OF THE DRAWINGS

Aspects of the invention are described in detail below with reference to the attached drawing figures, wherein.

DETAILED DESCRIPTION

The subject matter of aspects of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Aspects of the present invention provide a theft-resistant cable clamp that increases the time and effort required to remove the cable from the irrigation equipment, thereby deterring thieves. The cable clamp includes a cable-reception loop that secures the cable within the clamp and extensions that attach the cable clamp to irrigation equipment. As the extensions that protrude from the cable-reception loop are forced together, the walls of the cable-reception loop compress against the cable, thereby securing the cable within the cable-reception loop. In one aspect, the cable clamp is installed on components protruding from the irrigation equipment. Couplers are one example of a suitable component onto which the cable clamp may be installed. Irrigation equipment may have a series of couplers onto which sprinkler heads, drip lines, or other water distribution equipment may be attached.

Openings in the extensions on the cable clamp allow the cable clamp to fit over the component (e.g. coupler). A plurality of teeth can protrude from the perimeter of an opening to grip the exterior of the component. In one aspect, the area of the interior perimeter formed by the plurality of teeth is smaller than the area defined by the outside perimeter of the component onto which the clamp is installed. The difference in size causes the teeth to bend upward slightly as the cable clamp is pushed down on the component. A coupler or other component may have a groove into which the teeth engage.

As used in this application, the term "irrigation equipment" refers to any type of mechanized irrigation equipment. Exemplary types of MIE include, but are not limited to, center pivot, lateral move, and combinations thereof. Exemplary mechanized irrigation equipment includes a center pivot system. A center pivot irrigation system comprises a water conduit connected to a water source at a pivot point. Towers with motorized wheels are located along the length of the water conduit. Trusses may be used to support the conduit between the towers. Cables may run along the water conduit or trusses to provide electricity to the motors that move the wheels on the towers. The center pivot irrigation system moves in an arc centered at the pivot point. Sprinklers that distribute water to crops as the irrigation system moves around the arc are connected to couplers on the water conduit. A cable may run across the irrigation system to power the motors on the center pivot irrigation system. In aspects of the invention, the theft-resistant cable clamps, which secure the cable, may attach to the couplers on the water conduit.

Exemplary MIE includes, but is not limited to, a lateral move system. A lateral move system comprises a water conduit suspended across wheeled towers. The lateral move system moves laterally across an irrigation area. The lateral move system may relocate intermittently. For example, the lateral move system may remain in place while distributing water to a first irrigation area, stop distributing water while moving laterally to a second irrigation area, and then start distributing water to the second irrigation area while remaining in place. A hose supplying water to the lateral move system may need to be disconnected prior to relocation and then reattached once the lateral move system has successfully relocated. A cable may run across the irrigation system to power the motors on the lateral move system.

Figure 1:
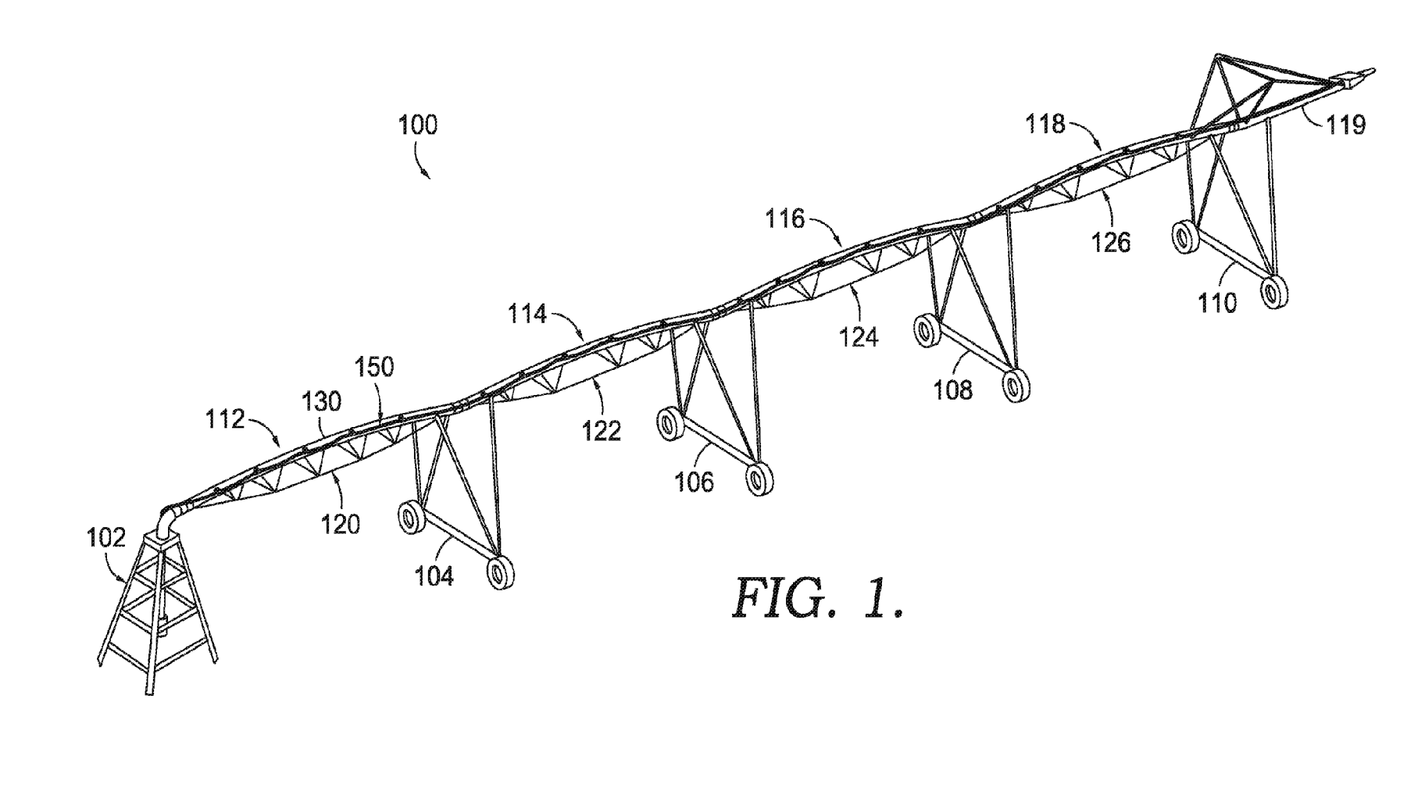
FIG. 1 is a diagram depicting an exemplary irrigation system of the center pivot type suitable for implementing aspects of the invention.

Turning now to FIG. 1, an exemplary mechanized irrigation system of the center pivot type 100 suitable for use with the theft-resistant cable clamp of the present invention is shown. As mentioned, aspects of the invention are not limited to use on a center pivot irrigation system. The center pivot irrigation system 100 extends from central tower 102. The central tower may be located adjacent to a water supply, such as a well. One or more pumps associated with the irrigation system supply water to water conduit 130, which runs the length of the center pivot irrigation system 100.

The center pivot irrigation system 100 comprises multiple spans. Spans shown in FIG. 1 include span 112, span 114, span 116, and span 118. Span 112 is supported by truss 120, which runs between central tower 102 and motorized tower 104. As can be seen, motorized tower 104 includes wheels that allow the tower 104 to move. Span 114 is supported by truss 122, which runs between motorized tower 104 and motorized tower 106. Span 116 is supported by truss 124, which runs between motorized tower 106 and motorized tower 108. Span 118 is supported by truss 126, which runs between motorized tower 108 and motorized tower 110. End boom 119 extends beyond motorized tower 110 to extend the irrigation system's irrigation range. Cable 150 runs the length of the water conduit 130 and provides power, and possibly control and communications, to each of the motorized towers.

In one aspect, the water conduit is galvanized steel or aluminum. Sprinklers are attached to couplers on the water conduit 130. Sprinklers used with an irrigation system can include impact sprinklers, rotator style, and drip lines.

Figures 2, 3:
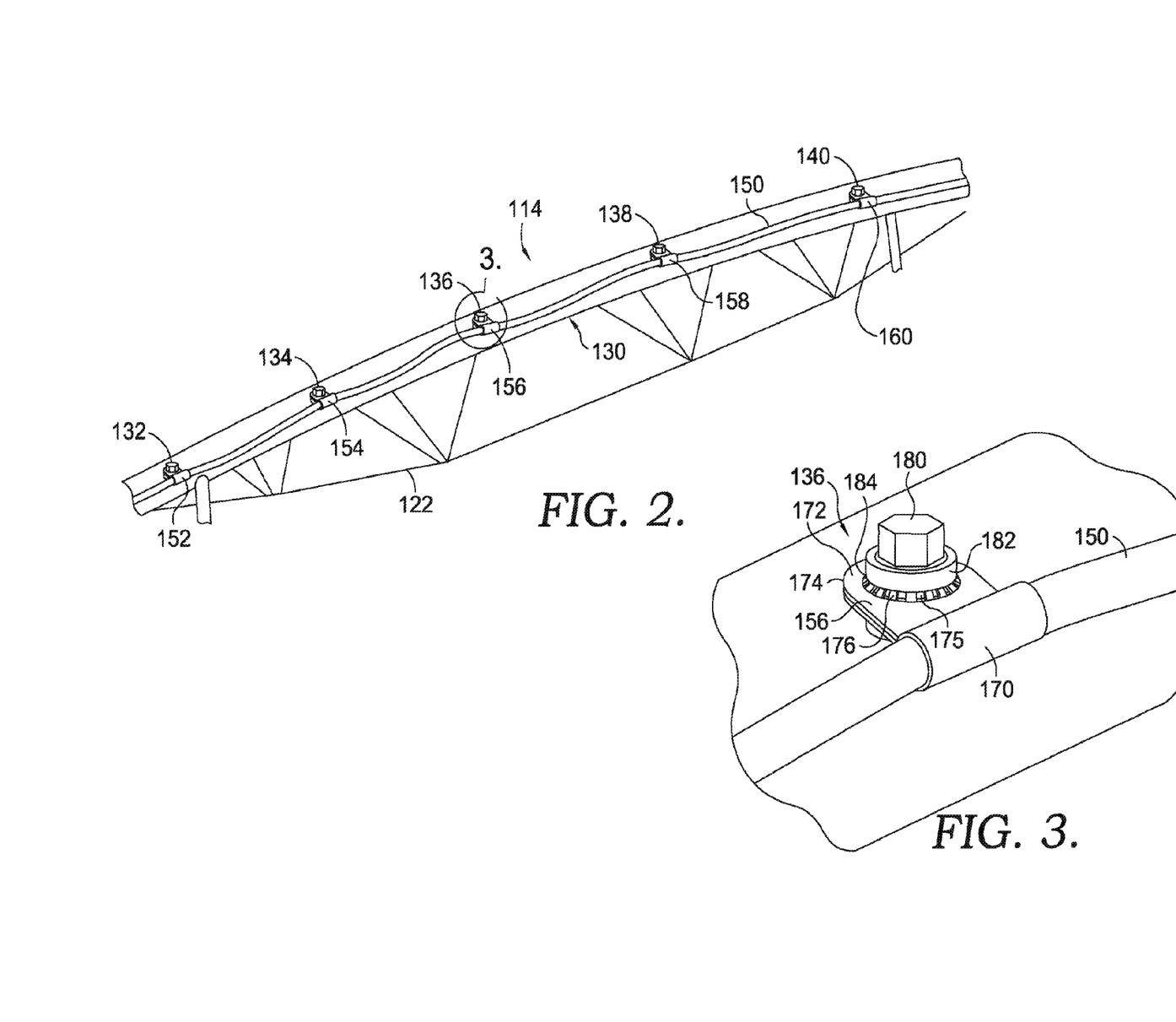
FIG. 2 is a diagram depicting a span on a mechanized irrigation system, in accordance with an aspect of the present invention.
FIG. 3 is a diagram depicting a theft-resistant cable clamp installed on a coupler, in accordance with an aspect of the present invention.

Turning now to FIG. 2, a detailed view of span 114 is shown. As can be seen, cable 150 is attached to water conduit 130 using a series of theft-resistant cable clamps attached to couplers on the water conduit 130. Though not shown for the sake of clarity, sprinklers could be installed in one or more of the couplers. Additionally, the cable does not have to be attached to every coupler on the water conduit. For example, it is contemplated that a cable could be attached to every other or every third coupler on the water conduit. Other patterns are possible. For example, the cable could be attached only to couplers that do not have a sprinkler installed on them. As mentioned, other components of the irrigation system may serve as attachment points for the theft-resistant cable clamps. Aspects of the present invention are not limited to installation on couplers.

The cable 150 is secured to coupler 132 by theft-resistant cable clamp 152. The cable 150 is secured to coupler 134 by theft-resistant cable clamp 154. The cable 150 is secured to coupler 136 by theft-resistant cable clamp 156. The cable 150 is secured to coupler 138 by theft-resistant cable clamp 158. The cable 150 is secured to coupler 140 by theft-resistant cable clamp 160.

Turning now to FIG. 3, the installation of theft-resistant cable clamp 156 on coupler 136 is shown, in accordance with an aspect of the present invention. As can be seen, cable 150 is secured within cable-reception loop 170. Pressure is applied to the cable 150 as the upper extension 172 and the lower extension 174 are forced together as a theft-resistant cable clamp 156 is installed on coupler 136. The teeth 176 disposed around the perimeter 175 of an opening through the theft-resistant cable clamp 156 are bent upwards as the theft-resistant cable clamp 156 is forced over the coupler 136. The teeth 176 may engage with a groove 184 in the coupler body 182. In some aspects of the present invention, a groove is not present in the coupler body 182.

The opening in the coupler body 182 is filled by plug 180, in this example. In another example, a sprinkler or attachment could be installed in coupler body 182. In this description, the combination of the coupler body 182 and a plug 180 may be described as a coupler 136. For example, the installation of a theft-resistant cable clamp on a plug can be described as being installed on a coupler to which the plug is attached. Similarly, the theft-resistant cable clamp could be installed on a sprinkling apparatus attached to the coupler and the cable clamp still be described as installed "on the coupler." In particular, grooves may be provided on a plug for engaging the teeth in the theft-resistant cable clamp.

The upward angle of the teeth 176, as installed, makes removing the theft-resistant cable clamp 156 difficult. In one aspect, the force required to remove the theft-resistant cable clamp 156 exceeds the force capable of being generated by an unaided human. Removal may require use of a leveraging tool, such as a crowbar or hammer. Because the water conduit 130 may be 10 feet or more off the ground, using a leveraging tool can be a challenge and significantly slow down the process of removing the theft-resistant cable clamp.

Figures 4, 5, 6, 7, 8:
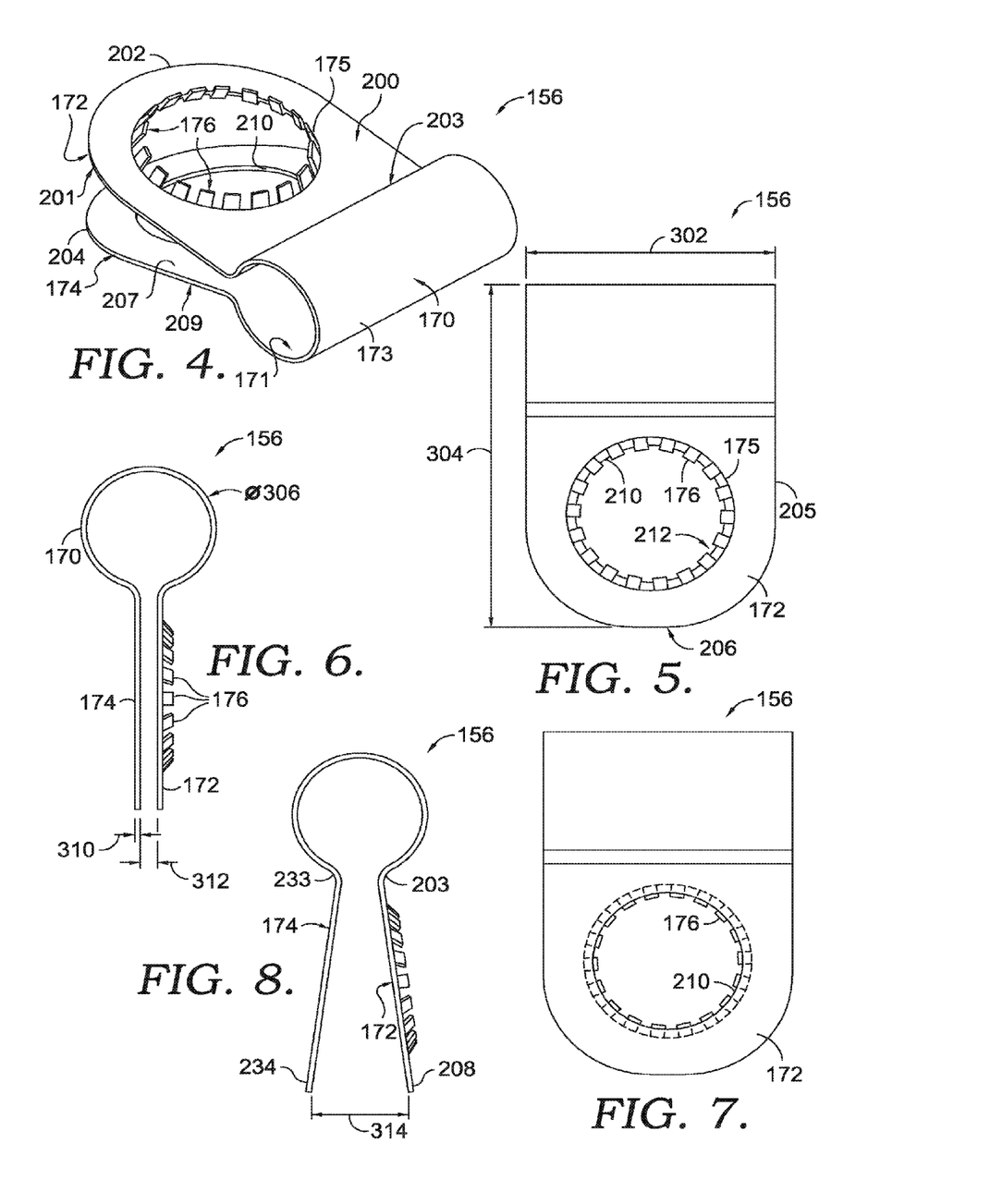
FIG. 4 is a diagram depicting a perspective view of a theft-resistant cable clamp, in accordance with an aspect of the present invention.
FIG. 5 is a diagram depicting a top view of a theft-resistant cable clamp, in accordance with an aspect of the present invention.
FIG. 6 is a diagram depicting a side view of a theft-resistant cable clamp, in accordance with an aspect of the present invention.
FIG. 7 is a diagram depicting a bottom view of a theft-resistant cable clamp, in accordance with an aspect of the present invention.
FIG. 8 is a diagram depicting a side view of a theft-resistant cable clamp having splayed extensions, in accordance with an aspect of the present invention.

Turning now to FIG. 4, a perspective view of the theft-resistant cable clamp 156 is shown, in accordance with an aspect of the present invention. The cable clamp 156 can be constructed from galvanized steel, stainless steel, including 304 or 316 stainless steel, or other suitable material. Suitable materials include those that are difficult to cut and have enough elasticity to avoid easily snapping. Suitable materials also should withstand a wet environment. The major components of cable clamp 156 include cable-reception loop 170, upper extension 172, a plurality of teeth 176, and lower extension 174. The two extensions are referred to as "upper" and "lower" based on the perspective shown in FIG. 4. However, the terms upper and lower are not meant to be limiting. The cable clamp 156 could be installed with the orientation shown. But the cable clamp 156 could alternatively be installed upside down, in which case the upper extension would be beneath the lower extension. In another aspect, the plurality of teeth is provided in an opening within the lower extension and not in an opening in the upper extension or in openings within both extensions. The upper and lower extensions could alternatively be described as a first extension and a second extension.

The upper extension 172, the cable-reception loop 170, the plurality of teeth 176, and the lower extension 174 may all be formed from a single member that is cut and bent into the form shown in FIG. 4. For example, the outline of the clamp, openings, and teeth could be punched from sheet metal and then bent to form the cable clamp.

The cable-reception loop 170 has an inner surface 171 and an outer surface 173. In one aspect, the inner surface 171 may be treated to increase friction between the inner surface and the cable. Treatments can include the addition of dimples or roughening the surface with an abrasive material. As mentioned, the cable-reception loop 170 is sized to receive a cable. Different size clamps may be provided for different types and sizes of cable. As upper extension 172 and lower extension 174 are forced together, the cable-reception loop 170 closes around the cable to compress and secure it within the loop.

The upper extension 172 has an upper surface 200 and a lower surface 201. The upper extension 172 is substantially planar. As used herein, "planar" means substantially flat across a surface without significant bends. A planar surface may have dimples, grooves, pores, and imperfections and still be considered planar. Further, a planar surface may have one or more openings, such as holes. The upper extension 172 extends to perimeter 202. The upper extension 172 meets the edge 203 of cable-reception loop 170.

The lower extension 174 has an upper surface 207 and a lower surface 209. The lower extension 174 extends to perimeter 204 and is substantially planar. The lower extension 174 defines the perimeter 210 of an opening.

The teeth 176 in FIG. 4 are shown bent away from the planar surface of upper extension 172. Aspects of the invention also include orienting the teeth 176 to be co-planar with the upper extension 172 in a pre-installation condition. The teeth 176 may then bend from a co-planar orientation to an orientation similar to that shown in FIG. 4 upon installation on a component.

Turning now to FIG. 5, a top view of the theft-resistant cable clamp 156 is shown, in accordance with an aspect of the present invention. The plurality of teeth 176 are substantially square in shape and evenly spaced around the perimeter 175 of the opening in the upper extension 172. Aspects of the invention are not limited to substantially square teeth or evenly spaced teeth. In other aspects, the teeth can be triangular, semi-circular, pointed, and such. The distal end of each tooth forms a circular interior perimeter 212. As used herein, the interior perimeter is substantially uniform and extends across the crotch between the teeth, rather than following each tooth's outline back to perimeter 175. The interior perimeter 212 can be smaller than perimeter 210 defined by the lower extension 174. In one aspect, perimeter 210 is sized and shaped to snugly fit on the component onto which the cable clamp 156 is to be installed. In another aspect, the perimeter 210 is the same size and shape as perimeter 175. The interior perimeter 212 is sized and shaped to be slightly smaller than an exterior perimeter of the component onto which the cable clamp 156 is to be installed. The slightly smaller interior perimeter 212 causes the teeth to bend upward slightly as the cable clamp 156 is installed onto the component.

The theft-resistant cable clamp 156 has a width 302 and a length 304. In one aspect, the width 302 is in a range between 1 and 4 inches, for example 1.75 inches. In one aspect, the length 304 is in a range between 1.5 and 8 inches, for example 2.66 inches.

In one aspect, the openings are substantially centered within both the lower extension 174 and the upper extension 172. For example, in one aspect, perimeter 175 and perimeter 210 both have center points one half of width 302 from edge 205. The center point may also be a half of width 302 from perimeter edge 206. The openings may be sized and shaped to fit over a coupler having a diameter of between 1 and 4 inches. For example, the openings may be circular to fit over a circular coupler.

Turning now to FIG. 6, a side view of cable clamp 156 is shown, in accordance with an aspect of the present invention. The cable-reception loop 170 has a diameter 306. In one aspect, the diameter ranges from 0.5 to 3 inches, for example ⅞ inch. The lower extension 174 has a thickness 310. In one aspect, the thickness ranges from 0.01 to 0.125, for example 0.032 inches. The entire cable clamp 156, including the extensions and teeth can have a uniform thickness. In one aspect, the cable clamp is cut from a single stock having a substantially uniform thickness. The distance 312 between the lower surface of extension 172 and the upper surface of extension 174 can range between 1 inch and a 1/16 inch. In one aspect, the distance 312 is ⅛ inch. The teeth 176 in FIG. 6 are shown bent away from the planar surface of upper extension 172. Aspects of the invention also include orienting the teeth 176 to be co-planar with the upper extension 172 in a pre-installation condition. The teeth 176 may then bend from a co-planar orientation to an orientation similar to that shown in FIG. 6 upon installation on a component.

Turning now to FIG. 7, a bottom view of the cable clamp 156 is shown, in accordance with an aspect of the present invention. The plurality of teeth 176 extends slightly beyond the perimeter 210.

Turning now to FIG. 8, a splayed extension arrangement is illustrated, in accordance with an aspect of the present invention. In a splayed arrangement, lower extension 174 and upper extension 172 are not parallel to each other and the edges 203 and 233 adjacent to the cable-reception loop are closer together than the opposite edges 208 and 234. When the extensions are splayed apart, the distance 314 at the edges can be significantly larger than the range given for distance 312 with reference to FIG. 6

The teeth in FIG. 8 are shown bent away from the planar surface of upper extension 172. Aspects of the invention also include orienting the teeth to be co-planar with the upper extension 172 in a pre-installation condition. The teeth may then bend from a co-planar orientation to an orientation similar to that shown in FIG. 8 upon installation on a component.

Figure 9:
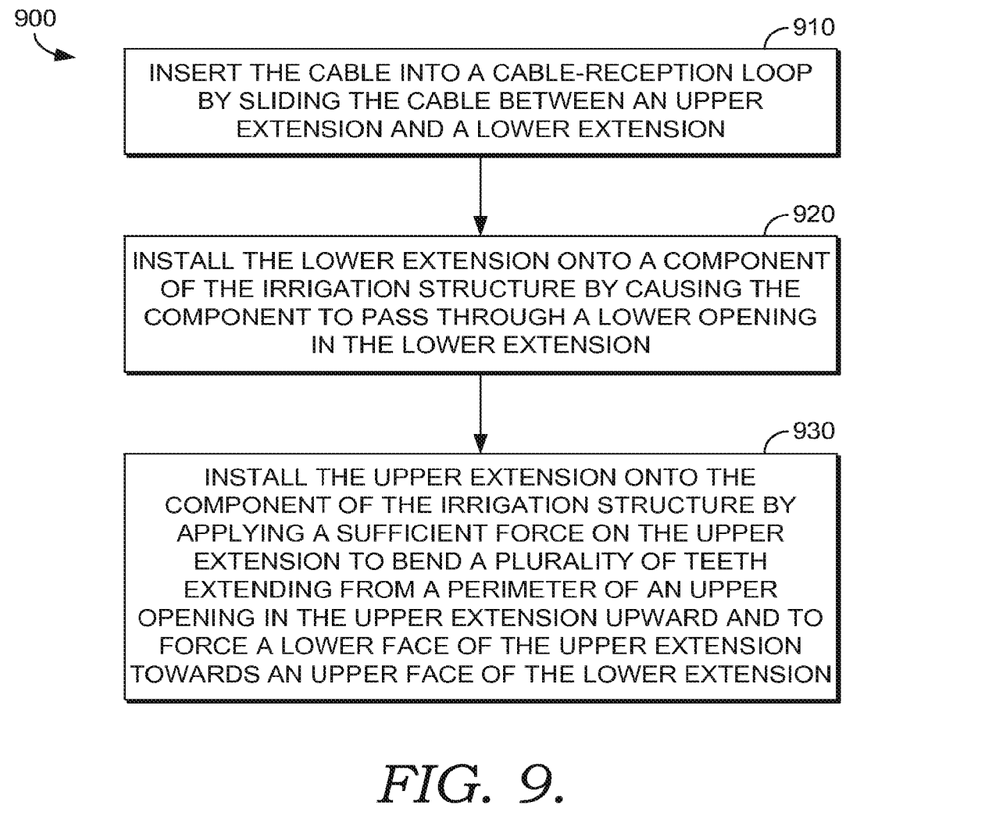
FIG. 9 is a diagram depicting a method of installing a theft-resistant cable clamp, in accordance with an aspect of the present invention.

Turning now to FIG. 9, a method of installing a theft-resistant cable clamp is provided, in accordance with an aspect of the present invention. The theft-resistant cable clamp may be similar to the theft-resistant cable clamp 156 described previously. The cable clamp may be installed on irrigation equipment, such as a center pivot irrigation system. The cable clamp may be installed on various components, such as a coupler on a water conduit on the irrigation system.

At step 910, a cable is inserted into the cable clamp's cable-reception loop by sliding the cable between an upper extension and a lower extension. A cable clamp having a cable-reception loop sized to receive a particular cable can be used. The cable-reception loop should compress against the exterior of the cable when the cable clamp is installed, making it difficult for the cable to slide out of the cable-reception loop. In one aspect, the cable is an electrical cable. In another aspect, the cable is a communication cable. In another aspect, multiple cables may be inserted into the cable-reception loop. In one aspect, when inserted into the cable loop, no portion of the cable should come between the extensions.

At step 920, the lower extension is installed onto a component of the irrigation structure by causing the component to pass through a lower opening in the lower extension. In other words, the lower opening is passed over the component on the irrigation equipment. For example, the lower extension may be passed over a coupler in the irrigation system. The lower opening may be slightly larger than the exterior of the component making it relatively easy for the lower extension to fit over the component.

At step 930, the upper extension is installed onto the component of the irrigation structure by applying a sufficient force on the upper extension to bend a plurality of teeth extending from a perimeter of an upper opening in the upper extension and to force a lower face of the upper extension towards an upper face of the lower extension. In other words, sufficient force is applied to push the cable clamp down onto the component and force the upper and lower extensions close together. In one aspect, installation of the upper extension onto the component of the irrigation system is accomplished by applying sufficient force on the upper extension to cause a plurality of teeth extending from a perimeter of an upper opening in the upper extension to slide down the exterior of the component. In another aspect, force is applied until the teeth reach a groove in the component. The groove corresponds with the final desired installation location on the component. The groove can be sized and shaped to receive a portion of the teeth. For example, the groove may be 1/32 inch deep and 1/16 inch wide. The groove may run around the exterior of the component with an orientation that is substantially parallel to the water conduit.

In one aspect, force is applied using a tool (e.g., a socket or a tube) that is large enough for the component to fit within the interior. The rim of the tool may apply force against the body of the upper extension. In one aspect, the rim of the tool is large enough to apply the force on a planar surface of the upper extension, rather than the plurality of teeth extending from the perimeter of the upper opening in the upper extension.

Aspects of the invention have been described to be illustrative rather than restrictive. It will be understood that certain features and subcombinations are of utility and may be employed without reference to other features and subcombinations. This is contemplated by and is within the scope of the claims.

The invention claimed is:

1. A method for securing a cable to an irrigation system with a theft-resistant cable clamp, the method comprising:
   inserting the cable into a cable-reception loop by sliding the cable between an upper extension and a lower extension;
   installing the lower extension onto a component on a water conduit of the irrigation system by causing the component to pass through a lower opening in the lower extension; and
   installing the upper extension onto the component on the water conduit by applying a sufficient force on the upper extension to slide a plurality of teeth extending from a perimeter of an upper opening in the upper extension over an exterior surface of the component and to force a lower face of the upper extension towards an upper face of the lower extension, the lower extension having a lower face oriented towards the water conduit.

2. The method of claim 1, wherein the force is applied by a tool having an interior volume sized to receive the component.

3. The method of claim 1, wherein the component is a coupler, and wherein the method further comprises removing an existing plug in the coupler and installing a new plug that has a groove sized to receive the plurality of teeth.

4. The method of claim 1, wherein method further comprises discontinuing the application of force upon the plurality of teeth engaging a groove in the component.

5. The method of claim 4, wherein the plurality of teeth are sized and shaped to engage the groove in a component onto which the theft-resistant cable clamp is installed.

6. The method of claim 1, wherein teeth in the plurality of teeth are evenly spaced around the perimeter.

7. The method of claim 1, wherein the component is a coupler, and wherein a distal end of the teeth, which are opposite an end that adjoins the perimeter, forms an interior perimeter with a circumference that is smaller than an exterior circumference of the coupler onto which the theft-resistant cable clamp is to be installed.

8. The method of claim 1, wherein the cable-reception loop has an interior diameter of between 0.5 inches and 2 inches.

9. The method of claim 1, wherein each tooth of the plurality of teeth is substantially square.

10. The method of claim 1, wherein the plurality of teeth are oriented to extend above the first upper face of the upper extension.

11. The method of claim 1, wherein the component is a cylindrical coupler having an exterior diameter of between 1 and 4 inches.

12. A method for securing a cable to an irrigation system with a theft-resistant cable clamp, the method comprising:
   inserting the cable into a cable-reception loop by sliding the cable between an upper extension and a lower extension;
   installing the lower extension onto a component on a water conduit of the irrigation system by causing the component to pass through a lower opening in the lower extension; and
   installing the upper extension onto the component of the irrigation system by applying a sufficient force on the upper extension to cause a plurality of teeth extending from a perimeter of an upper opening in the upper extension to slide down an exterior of the component.

13. The method of claim 12, wherein the force is applied by a tool having an interior volume sized to receive the component.

14. The method of claim 12, wherein the component is a coupler, and wherein the method further comprises removing an existing plug in the coupler and installing a new plug that has a groove sized to receive the plurality of teeth.

15. The method of claim 12, wherein method further comprises discontinuing the application of force upon the plurality of teeth engaging a groove in the component.

16. The method of claim 12, wherein the component is a coupler, and wherein the method further comprises removing an existing irrigation head in the coupler in order to install the theft-resistant cable clamp and then reinstalling the irrigation head in the coupler.

17. The method of claim 12, wherein the plurality of teeth are oriented to extend above the first upper face of the upper extension.

18. The method of claim 12, wherein the component is a cylindrical coupler having an exterior diameter of between 1 and 4 inches.

19. The method of claim 12, wherein teeth in the plurality of teeth are evenly spaced around the perimeter.

20. The method of claim 12, wherein the cable-reception loop has an interior diameter of between 0.5 inches and 2 inches.

\* \* \* \* \*